United States Patent
Franz et al.

(10) Patent No.: US 7,386,438 B1
(45) Date of Patent: Jun. 10, 2008

(54) IDENTIFYING LANGUAGE ATTRIBUTES THROUGH PROBABILISTIC ANALYSIS

(75) Inventors: Alexander Franz, Palo Alto, CA (US); Brian Milch, Berkeley, CA (US); Eric Jackson, Palo Alto, CA (US); Jenny Zhou, Sunnyvale, CA (US); Benjamin Diament, Berkeley, CA (US)

(73) Assignee: Google Inc., Mountain View, CA (US)

( * ) Notice: Subject to any disclaimer, the term of this patent is extended or adjusted under 35 U.S.C. 154(b) by 805 days.

(21) Appl. No.: 10/634,616

(22) Filed: Aug. 4, 2003

(51) Int. Cl.
*G06F 17/20* (2006.01)
*G10L 15/00* (2006.01)

(52) U.S. Cl. .......................... 704/8; 704/240

(58) Field of Classification Search ............ 704/5, 704/251, 1, 9, 8, 6, 2, 7, 257, 240, 233; 707/6, 707/3, 5, 102, 2; 709/246, 224
See application file for complete search history.

(56) References Cited

U.S. PATENT DOCUMENTS

| | | | |
|---|---|---|---|
| 6,125,362 A * | 9/2000 | Elworthy | 707/6 |
| 6,272,456 B1 * | 8/2001 | de Campos | 704/8 |
| 6,285,999 B1 | 9/2001 | Page | |
| 6,415,250 B1 * | 7/2002 | van den Akker | 704/9 |
| 2006/0041685 A1 * | 2/2006 | Bracewell et al. | 709/246 |

* cited by examiner

*Primary Examiner*—David Hudspeth
*Assistant Examiner*—Josiah Hernandez
(74) *Attorney, Agent, or Firm*—Fenwick & West LLP

(57) ABSTRACT

A system and method for identifying language attributes through probabilistic analysis is described. A set of language classes and a plurality of training documents are defined. Each language class identifies a language and a character set encoding. Occurrences of one or more document properties within each training document are evaluated. For each language class, a probability for the document properties set conditioned on the occurrence of the language class is calculated. Byte occurrences within each training document are evaluated. For each language class, a probability for the byte occurrences conditioned on the occurrence of the language class is calculated.

27 Claims, 9 Drawing Sheets

IDENTIFYING LANGUAGE ATTRIBUTES THROUGH PROBABILISTIC ANALYSIS

FIELD OF THE INVENTION

The present invention relates in general to language identification and, in particular, to a system and method for identifying language attributes through probabilistic analysis.

BACKGROUND OF THE INVENTION

Although the origins of the Internet trace back to the late 1960s, the more recently-developed Worldwide Web ("Web"), together with the long-established Usenet, have revolutionized accessibility to untold volumes of information in stored electronic form to a worldwide audience, including written, spoken (audio) and visual (imagery and video) information, both in archived and real-time formats. The Worldwide Web provides information via interconnected Web pages that can be navigated through embedded hyperlinks. The Usenet provides information in a non-interactive bulletin board format consisting of static news messages posted and retrievable by readers. In short, the Web and Usenet provide desktop access available to potentially any connected user to a virtually unlimited library of information in almost every language worldwide.

Information exchange on the Web and Usenet both operate under a client-server model. For the Web, individual clients typically execute Web browsers to retrieve and display Web pages in a graphical user environment. For the Usenet, individual clients generally execute news readers to retrieve, post and display news messages, usually in a textual user environment. Both Web browsers and news readers interface to centralized content servers, which function as data dissemination, storage and retrieval repositories. Since the Web and Usenet can provide information from sources located worldwide, users often specify language preferences via the Web browsers and news readers, which are sent to the content servers as part of each information request.

News messages available via the Usenet are cataloged into specific news groups and finding relevant content involves a straightforward searching of news groups and message lists. Web content, however, is not organized in any structured manner and search engines have evolved to enable users to find and retrieve relevant Web content, as well as news messages. As the amount and types of Web content have increased, the sophistication and accuracy of search engines have likewise improved. Existing methods used by search engines are based on matching search query terms to terms indexed from Web pages. More advanced methods determine the importance of retrieved Web content using, for example, a hyperlink structure-based analysis, such as described in S. Brin and L. Page, "The Anatomy of a Large-Scale Hypertextual Search Engine," (1998) and in U.S. Pat. No. 6,285,999, issued Sep. 4, 2001 to Page, the disclosures of which are incorporated by reference.

Search engines operate in two capacities, which both require identifying the language in which the content is expressed. First, search engines collect information about potentially retrievable Web content and news messages. As information collectors, search engines gather information about Web pages and news messages available from content servers located worldwide. Language identification is necessary to properly catalog the gathered information in a standardized representation to facilitate efficient indexing, storage and retrieval. Language identification information, though, is limited and is often unreliable. For example, parameters specifying the top level domain, character set encoding, response message headers, and embedded hypertext tags can provide some indication of the language used in the attached content, but default parameter settings can incorrectly identify a language and can cause incorrect outcomes.

Second, search engines disseminate requested Web content and news messages. As information sources, search engines generally strive to provide the highest quality results in response to a search query. Determining quality, though, is difficult, as the relevance of retrieved Web content is inherently subjective and dependent upon the interests, knowledge and attitudes of the user. Quality can be improved in several ways. For instance, a search engine can provide results in a language best suited to the preferences of the requesting user. Similarly, a search can translate Web content into a preferred language, where possible.

A typical search query scenario begins with either a natural language question or individual keywords submitted to a search engine. The search engine executes a search against a data repository describing information characteristics of potentially retrievable Web content or news messages and identifies candidate results. Searches can often return thousands or even millions of results, so most search engines typically rank or score only a subset of the most promising results. The top results are then presented to the user, usually in the form of Web content or news message titles, hyperlinks, and other descriptive information, such as snippets of text taken from the results.

Known text-based approaches to identifying the language in which the content is expressed rely purely on the content itself typically using machine-based learning methodologies. Language identifying hints, such as top level domain and tags, are ignored. Moreover, known-text based approaches operate on content encoded using Western language character sets, which assume fixed length encodings consisting of one-byte-per-character. Multiple length and variable length character encodings, such as found in East Asian languages, such as Chinese, Japanese and Korean, are not supported.

Accordingly, there is a need for efficiently identifying languages for content, including Web content and news messages, using probabilistic pattern analysis. There is a further need for determining document languages based on arbitrary groups of information elements and text analysis.

SUMMARY OF THE INVENTION

The present invention provides a system and method for training language identification and classifying documents based on language attributes. During training language identification, a set of language classes are defined and attribute and text models representing language attributes are formed. Each language class consists of a language name and a character set encoding name. The attribute model evaluates the conditional probabilistic match of select document property sets, such as a top level domain, character set Hypertext Markup Language (HTML) metatag or Hypertext Transport Protocol (HTTP) header information, and other factors, to the language classes. The text model evaluates the conditional probabilistic match of actual text to the language classes. The text is evaluated based on byte co-occurrences, preferably evaluated as trigrams, although any form or combination of n-grams could also be used. During document classification, each document is labeled by language class, or set of language classes, based on the attribute and text models. For efficiency, non-responsive language classes can be pruned from further consideration during document classification.

An embodiment provides a system and method for identifying language attributes through probabilistic analysis. A set of language classes and a plurality of training documents are defined. Each language class identifies a language and a character set encoding. Occurrences of one or more document properties within each training document are evaluated. For each language class, a probability for the document properties set conditioned on the occurrence of the language class is calculated. Byte occurrences within each training document are evaluated. For each language class, a probability for the byte occurrences conditioned on the occurrence of the language class is calculated.

A further embodiment provides a system and method for identifying documents by language using probabilistic analysis of language attributes. A set of language classes is defined. Each language class includes a language name and a character set encoding name. A training corpora consisting of a plurality of training documents is assembled. An attribute model is trained by evaluating a top level domain and character set encoding associated with each training document. For each language class, a probability for each such top level domain and character set encoding is calculated conditioned on the occurrence of the each language class. A text model is trained by evaluating co-occurrences of a plurality of bytes within each training document. For each language class, a probability for the byte co-occurrences is calculated conditioned on the occurrence of the each language class.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System Overview

Figure 1:
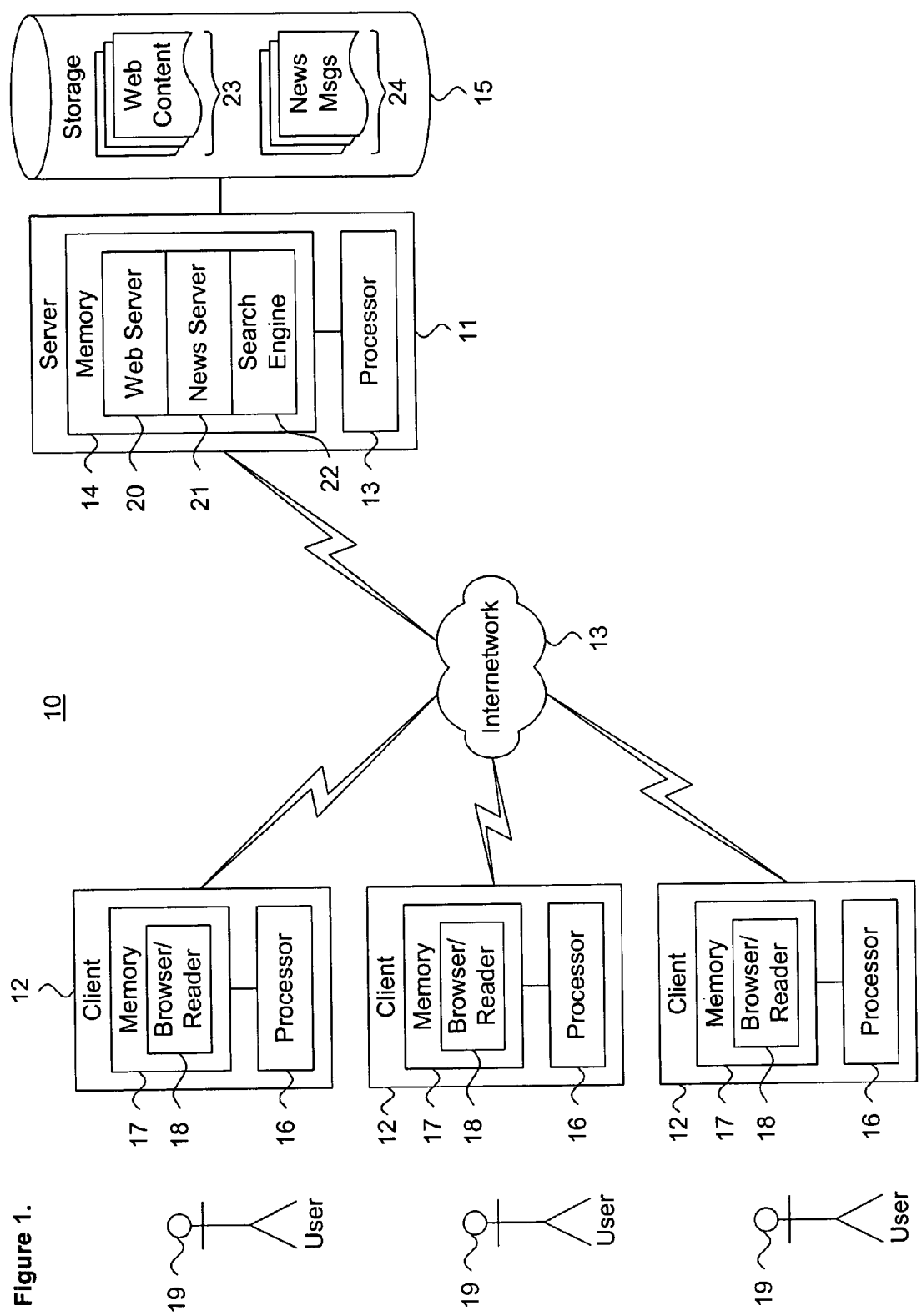
FIG. 1 is a block diagram showing a system for identifying language attributes through probabilistic analysis, in accordance with the present invention.

FIG. 1 is a block diagram showing a system 10 for identifying language attributes through probabilistic analysis, in accordance with the present invention. A plurality of individual clients 12 are communicatively interfaced to a server 11 via an internetwork 13, such as the Internet, or other form of communications network, as would be recognized by one skilled in the art. The individual clients 12 are operated by users 19 who transact requests for Web content, news messages and other operations through their respective client 12.

In general, each client 12 can be any form of computing platform connectable to a network, such as the internetwork 13, and capable of interacting with application programs. Exemplary examples of individual clients include, without limitation, personal computers, digital assistances, "smart" cellular telephones and pagers, lightweight clients, workstations, "dumb" terminals interfaced to an application server, and various arrangements and configurations thereof, as would be recognized by one skilled in the art. The internetwork 13 includes various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art.

For Web content retrieval and news message posting and retrieval, each client 12 executes a Web browser and news reader application 18 ("Browser/Reader"). Web content 23 is requested via a Web server 20 executing on the server 11. Similarly, news messages ("News Msgs") 24 are posted and retrieved via a news server 21 also executing on the server 11. Note the Web browsing and news reading functions could also be implemented separately as stand alone applications, as are known in the art. The server 11 maintains an attached storage device 15 in which the Web content 23 and the news messages 24 are stored. The Web content 23 and the news messages 24 could also be maintained remotely on other Web and news servers (not shown) interconnected either directly or indirectly via the internetwork 13 and which are preferably accessible by each client 12. A training server (not shown) discovers language identifying characteristics from a training corpora and stores the characteristics in a set of models, as further described below with reference to FIG. 2. A classifying server (also not shown) uses the models to identify the languages and encodings in which the Web content 23 and the news messages 24 are provided, as further described below with reference to FIG. 3.

In a further embodiment, a search engine 22 executes on the server 11 for processing queries for Web content 23 and news messages 24. Each query describes or identifies information, which is potentially retrievable via either the Web server 20 or news server 21. Preferably, each query provides characteristics, typically expressed as terms, such as keywords and the like, and preferences for describing results, such as language, character set encoding and so forth. A search engine 22, also executing on the server 11, receives each query, identifies matching Web content 23 and news messages 24, and send back results conforming to the query preferences. Other styles, forms or definitions of queries, query characteristics, and related metadata are feasible, as would be recognized by one skilled in the art.

The search engine 22 preferably identifies the Web content 23 and news messages 24 best matching the search query terms to provide high quality search results, such as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 23 and news messages 24, the search engine 22 operates on information characteristics describing potentially retrievable content. Note the functionality provided by the server 11, including the Web server 20, news server 21 and search engine 22, could be provided by a loosely- or tightly-coupled distributed or parallelized computing configuration, in addition to a uniprocessing environment.

The individual computer systems, including server 11 and clients 12, include general purpose, programmed digital computing devices consisting of a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Training Server

Figure 2:
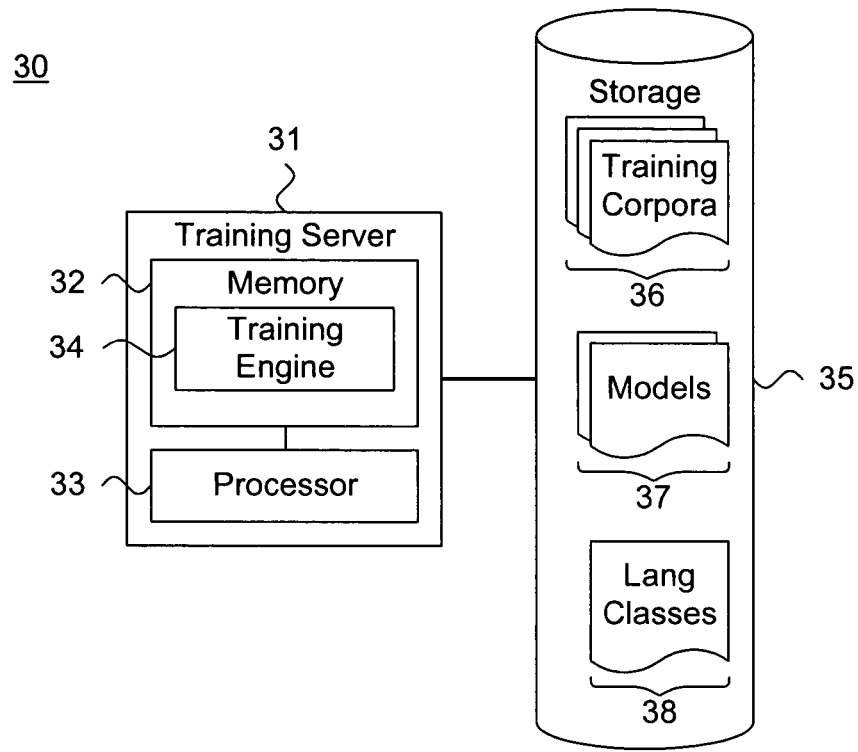
FIG. 2 is a functional block diagram showing a training server, in accordance with the present invention.

FIG. 2 is a functional block diagram 30 showing a training server 31, in accordance with the present invention. The training server 31 discovers language identifying characteristics from a training corpora 36 and stores the characteristics in a set of models 37. The training server 31 includes a training engine 34, which identifies language attributes through probabilistic analysis, as further described below with reference to FIG. 4.

The training server 31 maintains an attached storage device 35 in which the training corpora 36, the models 37 are stored. The training corpora 36 consists of documents that include Web content and news messages, including the Web content 23 the and news messages 24 stored by the server 11 (shown in FIG. 1), as well as documents from other sources, as is known in the art. Each document in the training corpora 36 is assigned an initial language class from a set of language classes ("Lang Classes") 38. Each language class consists of a pairing of a language and a character set encoding. The models 37 include an attribute model and a text model.

The individual computer system, including the training server 31, include general purpose, programmed digital computing devices consisting of a central processing unit (processor 33), random access memory (memory 32), non-volatile secondary storage 35, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Classifying Server

Figure 3:
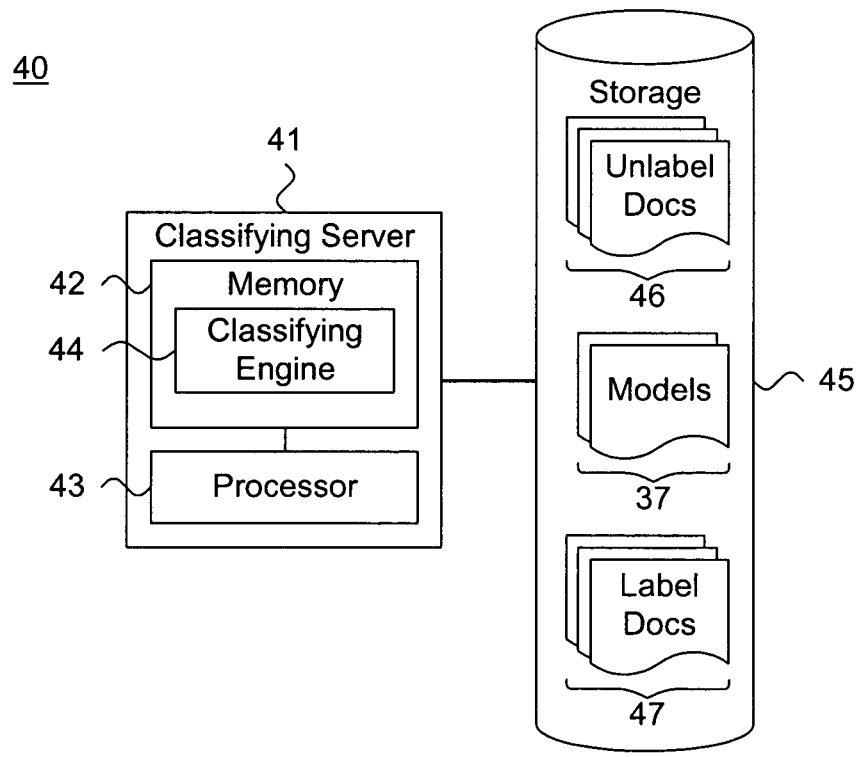
FIG. 3 is a functional block diagram showing a classifying server, in accordance with the present invention.

FIG. 3 is a functional block diagram 40 showing a classifying server 41, in accordance with the present invention. The classifying server 41 uses the models 37 to identify the languages and encodings in which documents are provided, including the Web content 23 and the new messages 24 (shown in FIG. 1), and to label the documents with one or more language classes, as further described below with reference to FIG. 9.

The classifying server 41 maintains an attached storage device 45 in which unlabeled documents ("Unlabel Docs") 46, the models 37, and labeled documents ("Label Docs") 47 are stored. The unlabeled documents 46 consists of documents that include Web content and news messages, including the Web content 23 and news messages 24 stored by the server 11 (shown in FIG. 1), as well as documents from other sources. The classifying models 37 include an attribute model and a text model.

The individual computer system, including the classifying engine 44, include general purpose, programmed digital computing devices consisting of a central processing unit (processor 43), random access memory (memory 42), non-volatile secondary storage 45, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Training Server Components

Figure 4:
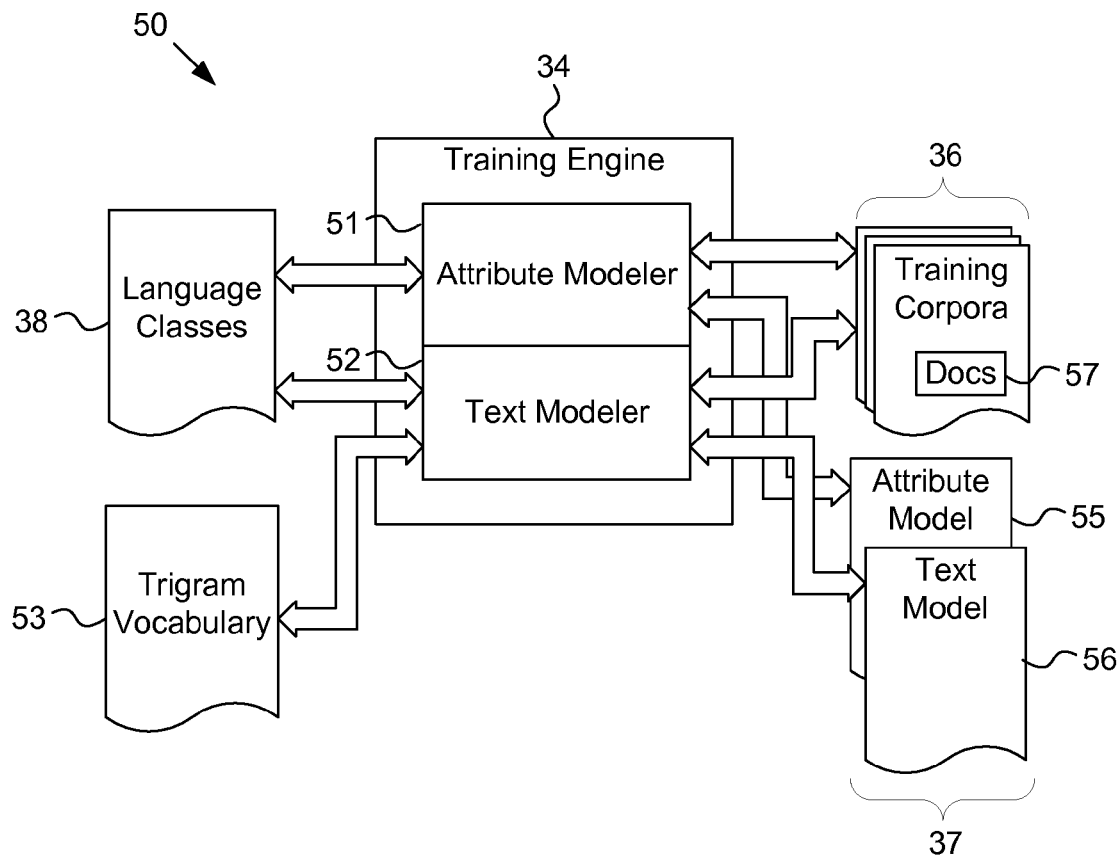
FIG. 4 is a functional block diagram showing the software modules used by the training engine of FIG. 2.

FIG. 4 is a functional block diagram 50 showing the software modules used by the training engine 34 of FIG. 2. The training engine 34 consists of an attribute modeler 51 and a text modeler 52 and references a list of language classes 38.

The attribute modeler 51 and text modeler 52 both operate on a training corpora 36, which consists of a set of training documents ("Docs") 57 that are each assigned an initial language class label, as further described below with reference to FIG. 6. The attribute modeler 51 and text modeler 52 respectively train the attribute model 55 and text model 56, as further described below respectively with reference to FIGS. 7 and 8. Briefly, the attribute modeler 51 evaluates language attributes associated with each document 57 in the training corpora 36 to build the attribute model 55. The text modeler 52 references a stored trigram vocabulary 53, which defines a finite set of recognized trigrams of bytes, to build the text model 56. The attribute modeler 51 and text modeler 52 operate as independent processes. The individual datum will now be described.

Language Classes

Language attributes are classified by language class 38. Each language class 38 consists of a pairing of a language and a character set encoding. The language classes 38 are independent of the document properties, particularly with respect to HTML metatags and HTTP header information describing character set encodings and language properties. For instance, one language class 38 for Japanese is "Japanese/Shift-JIS," where Shift-JIS is an encoding for Japanese Kanji characters. Some languages, such as Japanese, have multiple differing character set encodings and correspond to multiple language classes 38. Conversely, some languages, such as English, also have multiple character set encodings, but can be combined into a single language class 38 for efficiency.

Documents

The training corpora 36 consists of training data in the form of documents 57. Each document 57 includes associated properties, which depend on the type, format and content of the document 57. Documents 57 non-exclusively include Web pages, news messages, word processing and text documents, graphical and pictorial imagery, audio and video clips, and other forms of electronically storable information, as are known in the art. In the described embodiment, the properties include the top level domain (TLD), HTTP content character set encoding and language header parameters, HTML content character set encoding and language metatags, and other attributes, as would be recognized by one skilled in the art. The properties also include the language in which the text or content is expressed, and other properties, as would be recognized by one skilled in the art. For documents 57 provided as either a Web page or a Usenet message, text is parsed to generate a raw sequence of bytes. Other document sources are possible, as would be recognized by one skilled in the art.

Each document 57 in the training corpora 36 is preferably selected to have a high probability of being in a target language class 38. The quality of each document 57 as training data is more important than the quantity of documents 57 in the training corpora 36. Similarly, the number of byes in each document 57 is a better measure of the size of the training data than the number of individual documents 57. In the described embodiment, candidate documents can be selected for inclusion in the training corpora 36 in one of several non-exclusive ways. First, candidate documents can be selected based on a manual review of the type, format and content of each document and assigned an initial language class 38. Second, candidate documents can be analyzed through automated means and assigned an initial language class 3 8. Finally, candidate documents can be assigned an initial language class 38 based on one or more identified attributes. Other approaches to selecting candidate documents for the training corpora 36 and assigning an initial language class 38 are possible, as is known in the art.

By way of example, candidate documents assigned an initial language class 38 based on one or more identified properties can include Web pages having an explicit tag identifying a character set encoding or labeling the content as being in a target language. Explicit tags can either be associated with or be embedded within a document. For instance, Web pages received from a Web server 20 in an HTTP response message can include Content-Type and Content-Language header parameters, such as the following parameters specifying content written in French using the ISO-LATIN-1 character set encoding:

Content-Type: text/plain; charset=iso-latin-1 Content-Language: fr

By way of further example, candidate documents assigned an initial language class 38 based on one or more identified properties can include Web pages written in HTML For instance, Web pages can include a metatag specifying a character set encoding or language, such as the following metatags specifying a partial Web page written in French using the ISO-LATIN-1 character set encoding:

<HEAD>
<META CHARSET=iso-latin-1>
<META LANG-='fr'>
</HEAD>
.
.
.

Note the Content-Language headers and LANG meta tags tend to be found infrequently and are often unreliable.

Similarly, candidate documents assigned an initial language class 38 based on one or more identified properties can also include Web pages and Usenet messages originating from a source having a top level domain (TLD) associated with a target language. For example, Web pages or Usenet messages received from a server having a top level domain of ".es," that is, for Spain, can be selected as content written in Spanish. However, top level domains are generally only available for nationally-spoken languages and generally not for dialects or dead languages, such as classical Greek or Olde English, or pseudo-languages, such as Klingon. Moreover, many languages are not closely associated with any top level domain.

Attribute Model and Text Model

The attribute model 55 and text model 56 are generated by the training engine 34 and are used by the classifying engine 44 to statistically classify documents 57. The attribute model 55 and text model 56 associate document properties to one or more language classes 38, which each include an assigned probability. The attribute model 55 evaluates the match of top level domains and character set encodings to language classes 38. The text model 56 evaluates the match of text to language classes 38.

In identifying language attribute probabilities, the training engine 34 applies a probabilistic Bayesian classifier based on equation (1):

$$\operatorname*{argmax}_{cls} P(cls \mid text, tld, enc) \qquad (1)$$

where cls is a language class 38, text is text parsed from a document 57, tld is the top level domain of the document 57, enc is the character set encoding of the document 57, such as expressed in a tag identifying a character set encoding, and P(cls|text,tld,enc) is the probability of a language class, cls, conditioned on the occurrence of the text, text, top level domain, tld, and character set encoding, enc. Assuming independence between P(text|cls) and P(tld,enc|cls), equation (1) can be reformulated using Bayes law into equation (2):

$$\operatorname*{argmax}_{cls} P(text \mid cls) \cdot P(tld, enc \mid cls) \cdot P(cls) \qquad (2)$$

where P(text,tld,enc) is constant across all language classes 38. The attribute model 55 accounts for P(tld,enc|cl/s)·P(cls), that is, the probability of a top level domain, tld, and character set encoding, enc, conditioned on the occurrence of a language class, cls, and the probability of the language class, cls, as further described below with reference to FIG. 7. The text model 56 accounts for P(text|cls), that is, the probability of certain text, text, conditioned on the occurrence of a language class, C/s, as further described below with reference to FIG. 8.

Labeled Documents

Each unlabeled document 46 includes one or more of the properties associated with the language classes 38. For each unlabeled document 46, the classifying engine 44 identifies the available document properties and applies the overall probabilities by language class 38 to identify the language class 38 of the unlabeled document 46. The language classes 38 are stored with the unlabeled document 46 to form a labeled document 47.

Method Overview

Figure 5:
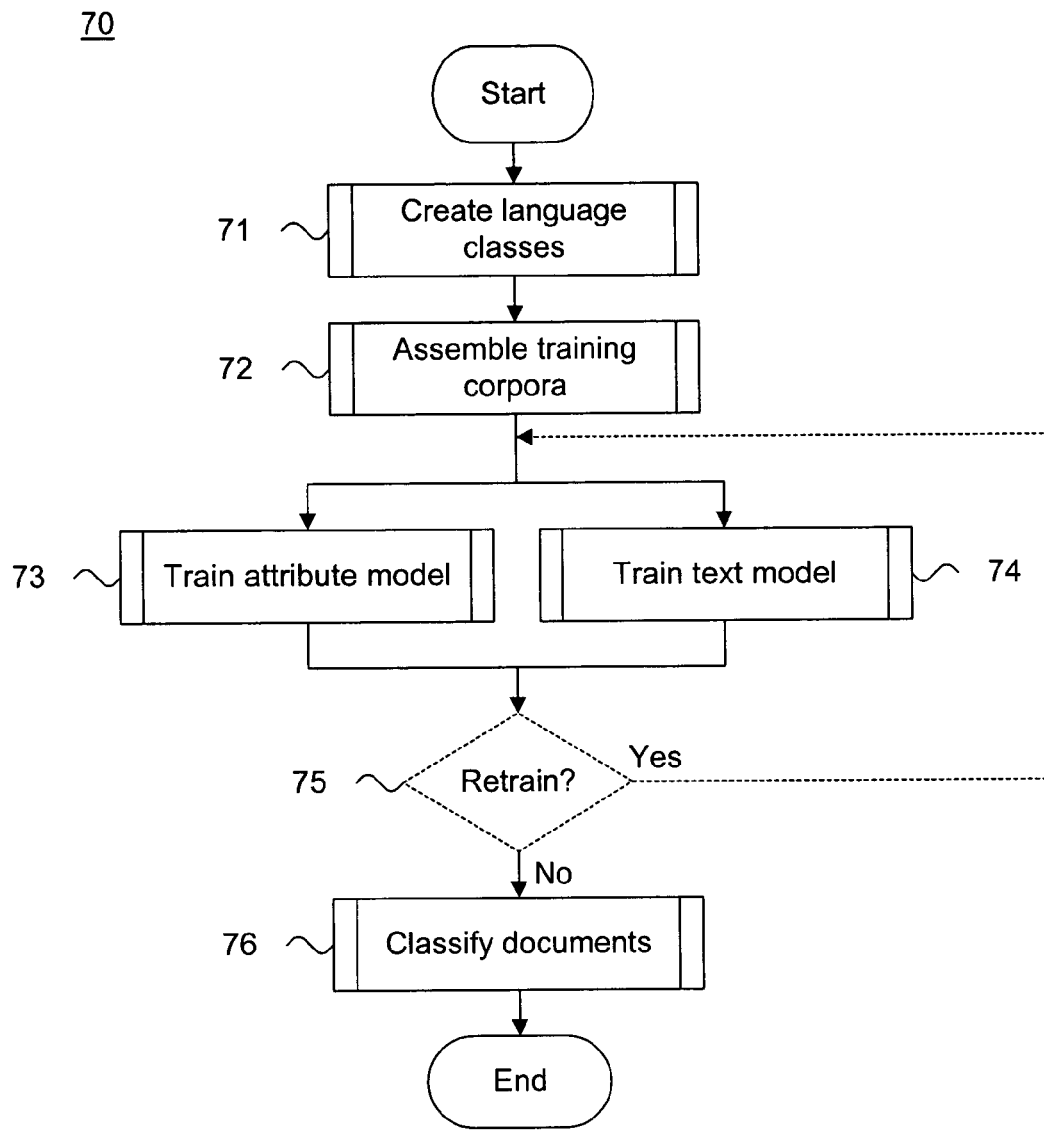
FIG. 5 is a flow diagram showing a method for training the model and identifying language attributes through probabilistic analysis, in accordance with the present invention.

FIG. 5 is a flow diagram showing a method 70 for training the model and identifying language attributes through probabilistic analysis, in accordance with the present invention. The method 70 is described as a sequence of process operations or steps, which can be executed, for instance, by the training engine 34 of FIG. 2 and the classifying engine 44 of FIG. 3, or equivalent components.

The goal of the method 70 is twofold: training and classifying. First, the method 70 evaluates the probability of a language class 38 by solving for equation (2), described above, to generate the attribute model 55 and text model 56. Second, the method 70 classifies documents 57 by assigning one or more language classes 38 based on document properties. Document training and document classification are independent processes. However, document training must be completed as a prerequisite to document classification.

As an initial step, a list of language classes 38 is created (block 71). The language classes list stores each language class 38 as a pairing of a language and a character set encoding, along with an assigned probability. The probabilities are initially undefined. Next, the training corpora 36 is assembled from a set of candidate documents 57 (block 72). In the described embodiment, candidate documents can be selected for inclusion in the training corpora 36 in one of several non-exclusive ways. First, candidate documents can be selected based on a manual review of the type, format and content of each document and assigned an initial language class 38. Second, candidate documents can be analyzed through automated means and assigned an initial language class 38. Finally, candidate documents can be assigned an initial language class 38 based on one or more identified attributes. Other approaches to selecting candidate documents for the training corpora 36 and assigning an initial language class 38 are possible, as is known in the art.

The attribute model 55 and text model 56 are trained (blocks 73 and 74, respectively). In the described embodiment, the attribute model 55 and text model 56 are trained independently. The attribute model 55 accounts for $P(tld,enc|cls)\cdot P(cls)$, as further described below with reference to FIG. 7. The text model 56 accounts for $P(text|cls)$, as further described below with reference to FIG. 8.

In the described embodiment, the language class probabilities for the attribute model 55 are raised by a predefined power before multiplying each language class probability with the language class probabilities for the text model 56. In addition, the language attribute probabilities are stored and represented in the logarithmic domain, rather than in the scalar domain. Logarithmic values are used for efficiency: logarithmic values can be accumulated through simple addition, whereas accumulating scalar values must be multiplied and are computationally expensive. Further, each language attribute probability is represented as an eight-bit unsigned integer value to save storage space, although other sizes and types of storage elements could be used, as would be recognized by one skilled in the art.

Optionally, the attribute model 55 and text model 56 can be retrained (block 75). Following training and any optional retraining, unlabeled documents 46 are classified (block 76), as further described below with reference to FIG. 9. The method then terminates.

Assembling Training Corpora

Figure 6:
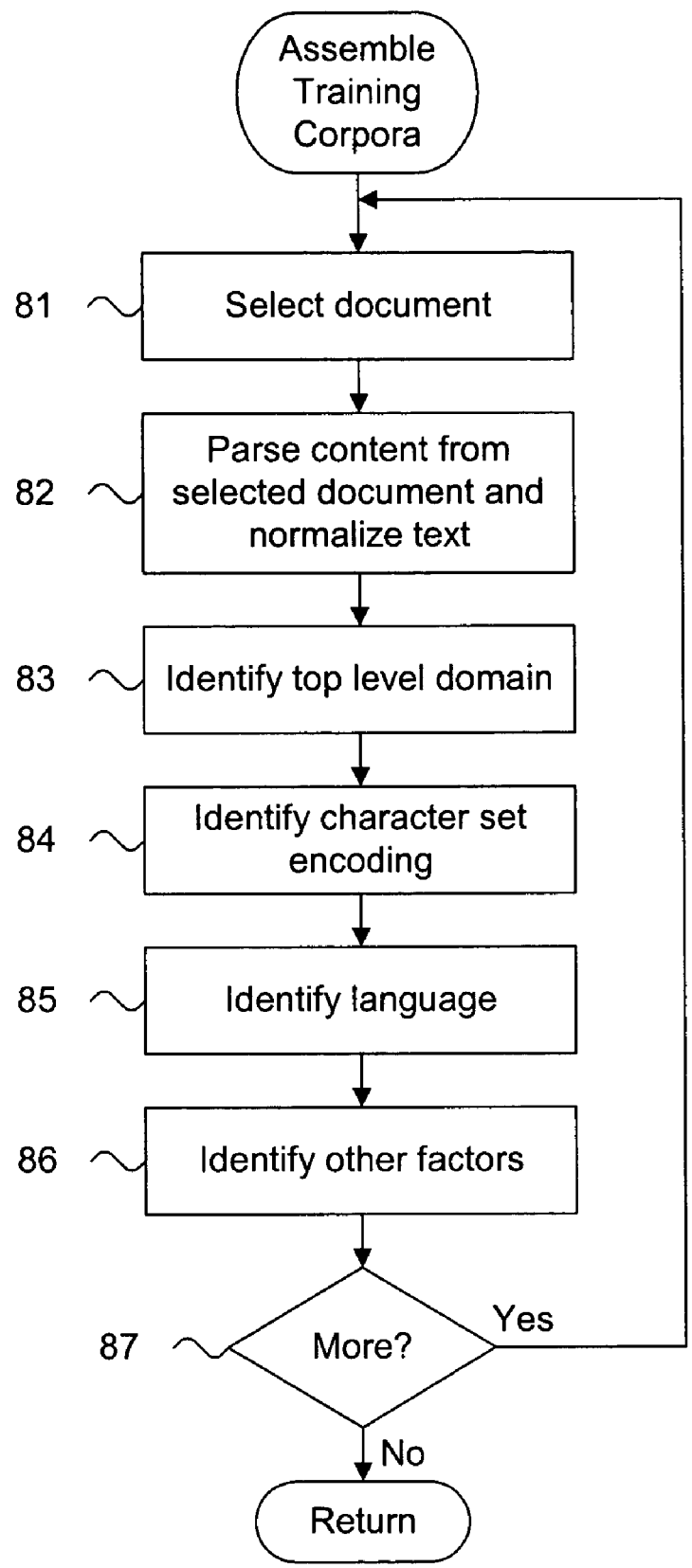
FIG. 6 is a flow diagram showing the routine for assembling the training corpora for use in the method of FIG. 5.

FIG. 6 is a flow diagram showing the routine 80 for assembling the training corpora 36 for use in the method 70 of FIG. 5. The purpose of this routine is to select and prepare the documents 57 in the training corpora 36.

First, a document 57 is selected (block 81). Documents having explicit language tags, documents originating from specific top level domains, and manually selected documents can be selected into the training corpora 36. Other types of documents 57 containing express or implied language hints could be also selected, as would be recognized by one skilled in the art.

Content is parsed from the document 57 and the text is normalized (block 82). For Web pages, the text is parsed from the body of the page. For Usenet messages, the text is parsed from the news message body. In the described embodiment, text is normalized in two ways. First, bytes corresponding to non-alphabetic characters are skipped, which excludes characters 'A' through 'Z,' 'a' through 'z,' spaces, new lines, carriage returns, apostrophe marks. Although this approach might appear to favor single-byte character set encodings, multiple byte character set encodings tend to be distinct and skipping non-alphabetic characters does not empirically effect the identification of longer encodings. Second, every byte corresponding to an uppercase ASCII character is converted to a lower-case ASCII character. Other forms of text normalization are possible, as would be recognized by one skilled in the art.

Next, if available, the properties of the document 57 are identified, including the top level domain (block 83), character set encoding (block 84) and language (block 85). Additional documents 57 are selected and prepared (block 87), after which the routine returns.

Training Attribute Model

Figure 7:
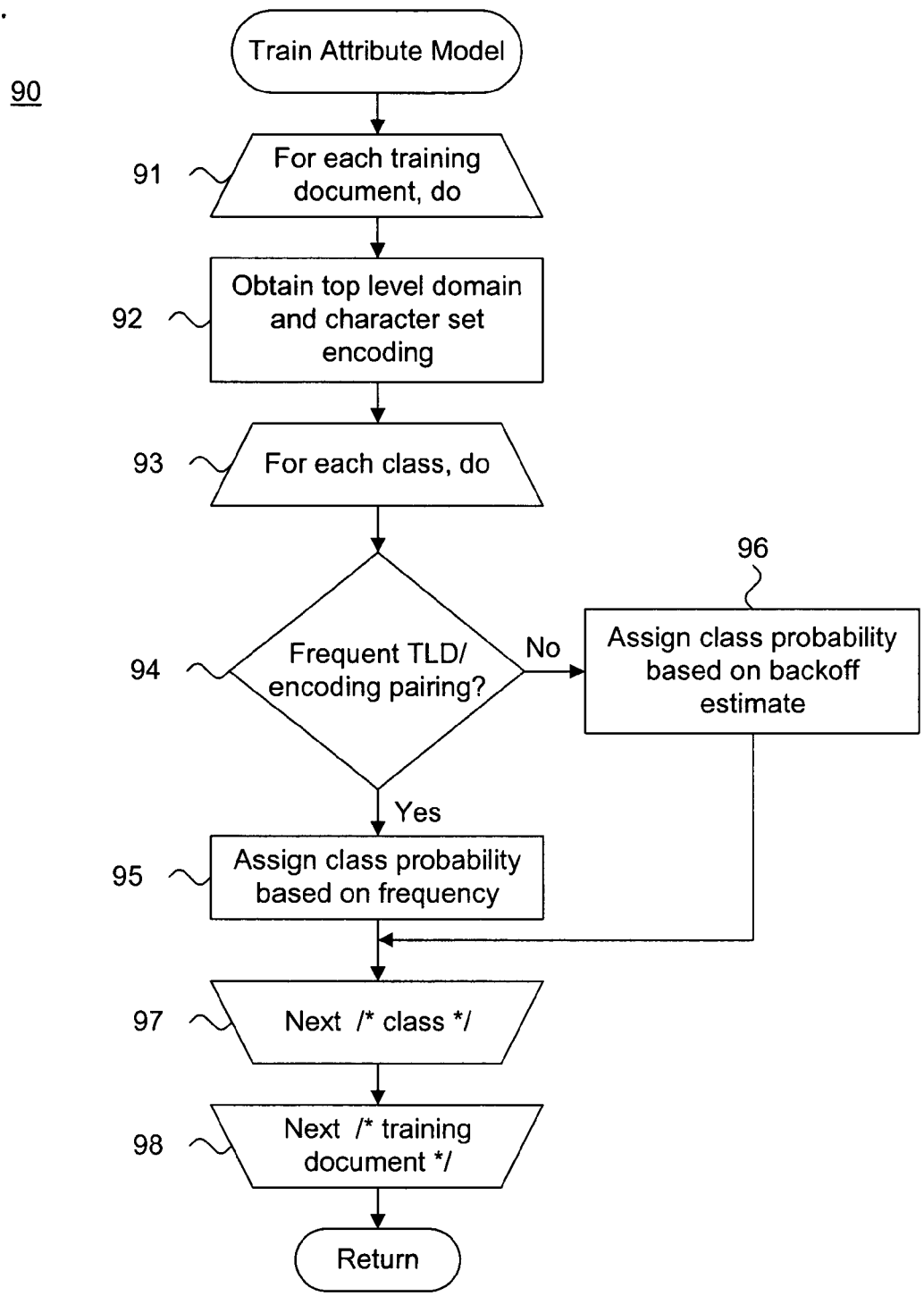
FIG. 7 is a flow diagram showing the routine for training the attribute model for use in the method of FIG. 5.

FIG. 7 is a flow diagram showing the routine 90 for training the attribute model 55 for use in the method 70 of FIG. 5. The purpose of this routine is to train the attribute model 55 by evaluating pairings of top level domains and character set encodings. The attribute model 55 accounts for $P(tld,enc|cls)\cdot P(cls)$.

The language classes 38 assigned to each document 57 in the training corpora 36 are processed in a pair of iterative processing loops (blocks 91-96 and 92-97, respectively), as follows. Each training document 57 in the training corpora 36 is selected (block 91) and the top level domain and character set encoding are obtained (block 92). Each language class 38 assigned to each training document 57 is selected (block 93) using language class records. If the top level domain and character set encoding pairing occurs frequently (block 94), a probability is assigned to the language class 38 (block 95) for the pairing by solving for $P(tld,enc|cls)\cdot P(cls)$. Otherwise, a probability based on a back off estimate is assigned to the language class 38 (block 96) for the pairing by solving for $P(tld|cls)\times P(enc|cls)$. Each remaining language class 38 and training document 57 is iteratively processed (blocks 97 and 98, respectively), after which the routine returns.

In the described embodiment, an initial set of probabilities are assigned based on empirically observed frequencies of occurrence for each top level domain and character set encoding pairing or, if infrequent, the frequencies of occurrence for each top level domain and character set encoding alone. The initial set of probabilities merely provides a starting point and can vary greatly from the final set of probabilities. During retraining, the set of probabilities is reassigned based on the language class probabilities determined by the text model 56.

Training Text Model

Figure 8:
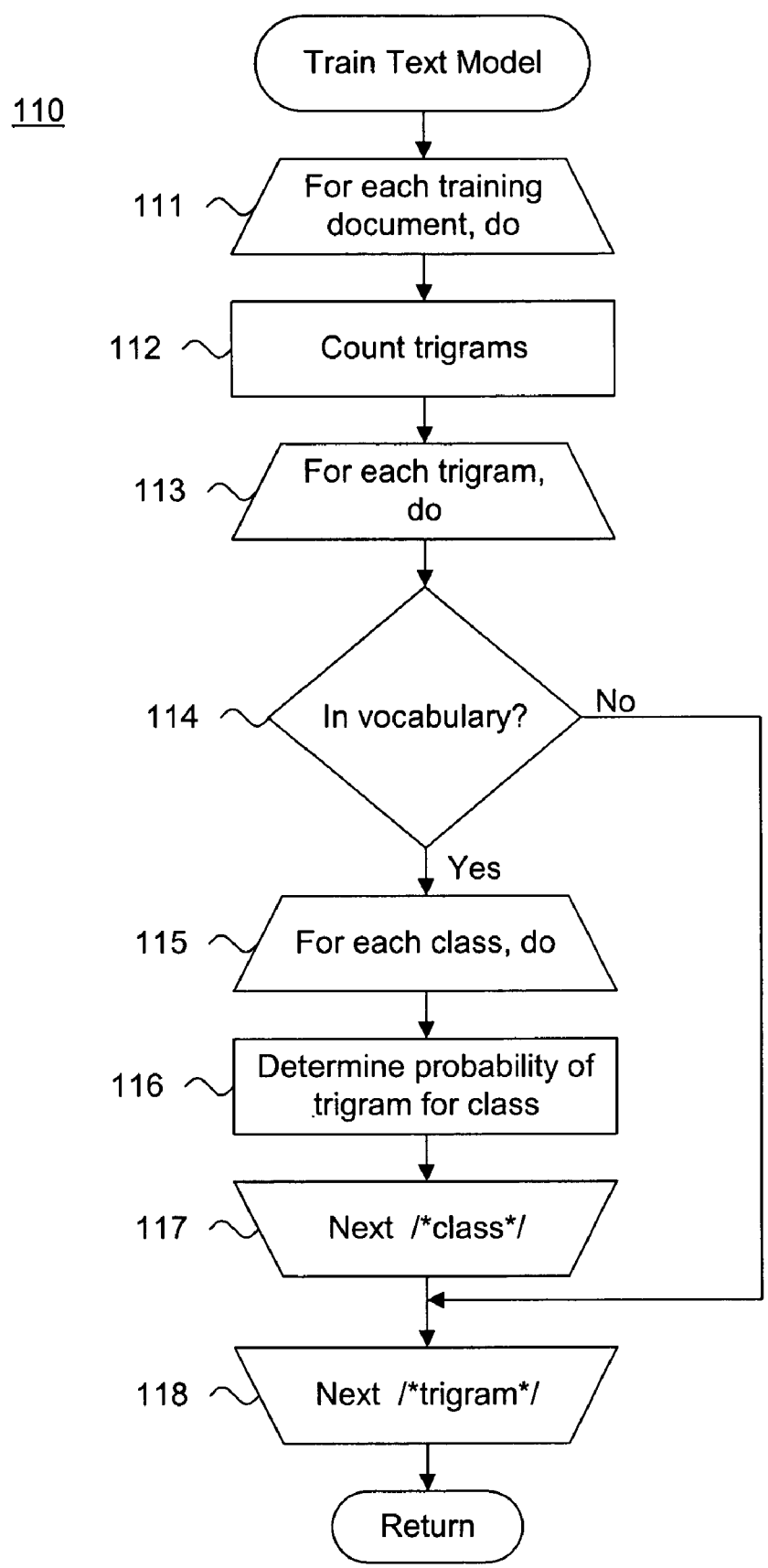
FIG. 8 is a flow diagram showing the routine for training the text model for use in the routine of FIG. 5.

FIG. 8 is a flow diagram showing the routine 110 for training the text model 56 for use in the method 70 of FIG. 5. The purpose of this routine is to train the text model 56 by evaluating trigrams extracted from the text, although any form or combination of n-grams could also be used. The text model 56 accounts for $P(text|cls)$.

Each document 57 in the training corpora 36 is processed in an iterative processing loop (blocks 111-117), as follows. Each training document 57 in the training corpora 36 is selected (block 111) and each trigram of bytes occurring in the training document 57 is counted (block 112). Each trigram is processed in an iterative processing loop (blocks 113-118), as follows. The trigram is skipped if not listed in a vocabulary of trigrams (block 114). If the trigram is in the vocabulary (block 114), each language class 38 is processed in an iterative processing loop (blocks 115-117), as follows. For each language class 38 (block 115), a probability for the trigram for the language class 38 is determined (block 116). Processing continues with each remaining language class (block 117) and trigram (block 118), after which the routine returns.

In the described embodiment, the trigram vocabulary 53 is selected based on the sum of the trigram probabilities across all language classes 38. Trigrams are evaluated, although any form or combination of n-grams could also be used, including unigrams and bigrams, as would be recognized by one skilled in the art. Trigrams provide support for single, multiple and variable length character set encodings, and thereby facilitate the processing of documents written in languages, such as Chinese, Japanese and Korean.

The probability of each trigram is the number of occurrences of the trigram divided by the total number of observed trigram occurrences in the training corpus 36 for a given language class, as determined based on equation (3):

$$P(b_i, b_{i-1}, b_{i+2}) = \frac{f(b_i, b_{i+1}, b_{i+2})}{\text{total \# of trigrams}} \quad (3)$$

where f is a frequency function and $b_i$, $b_{i+1}$ and $b_{i+2}$ are three successive bytes i through i+2 forming a trigram. The probability of each trigram conditioned on the occurrence of a language class 38 is based on the probability of the language class 38 evaluated in the attribute model 55, as determined based on equation (4):

$$P(b_i, b_{i+1}, b_{i+2}) = \frac{f(b_i, b_{i+1}, b_{i+2} \mid cls)}{\text{total \# of trigrams in class}} \quad (4)$$

where f is a frequency function and cls is the language class 38. The probability for the language class 38 is the product of the joint probabilities of each trigram, as determined based on equation (5):

$$P(text \mid cls) = \prod_{i \to i-2} P(b_i, b_{i+1}, b_{i+2} \mid cls) \quad (5)$$

where text is the extracted text for the document 57.

Classifying Documents

Figure 9:
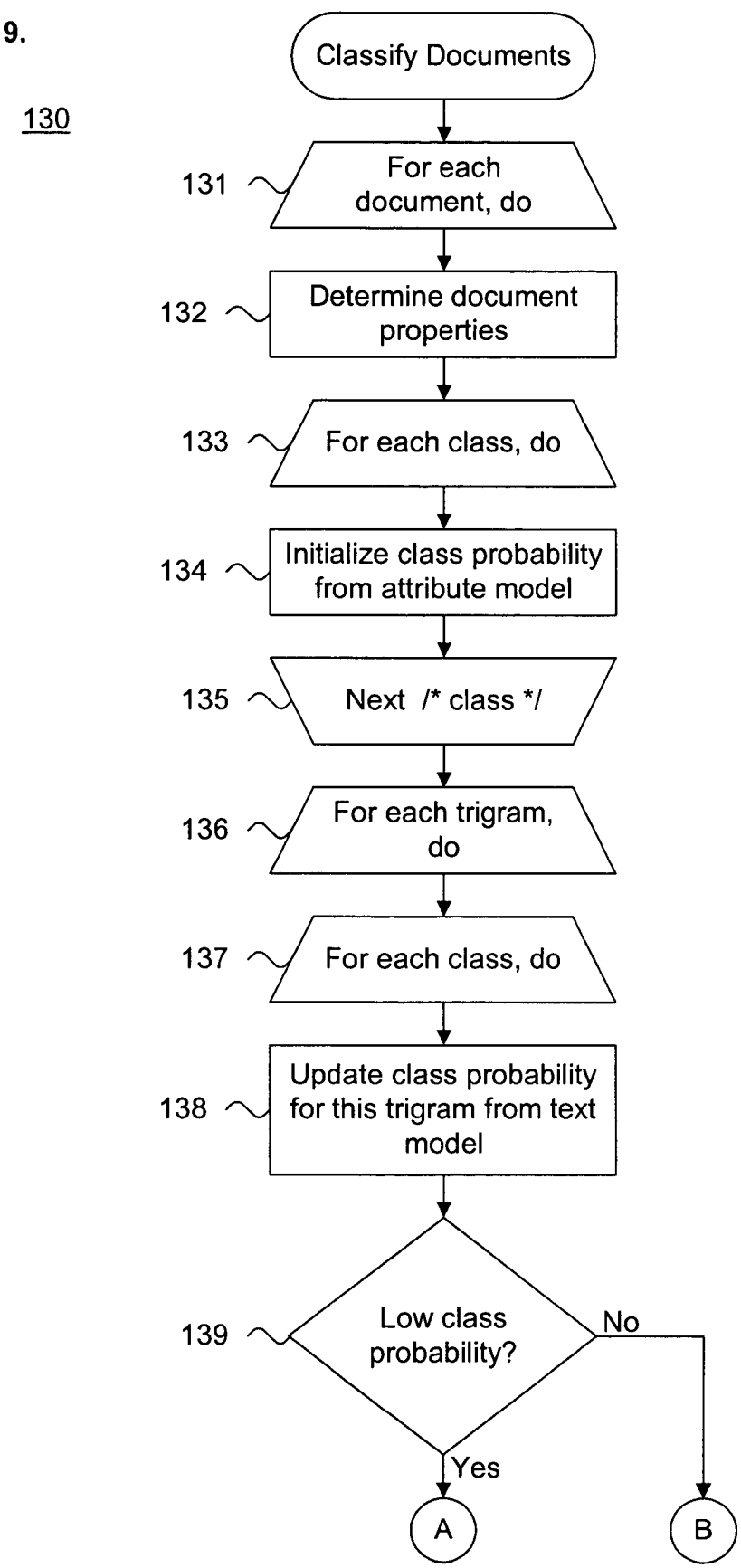
FIG. 9 is a flow diagram showing the routine for classifying documents for use in the routine of FIG. 5.
Figure 9:
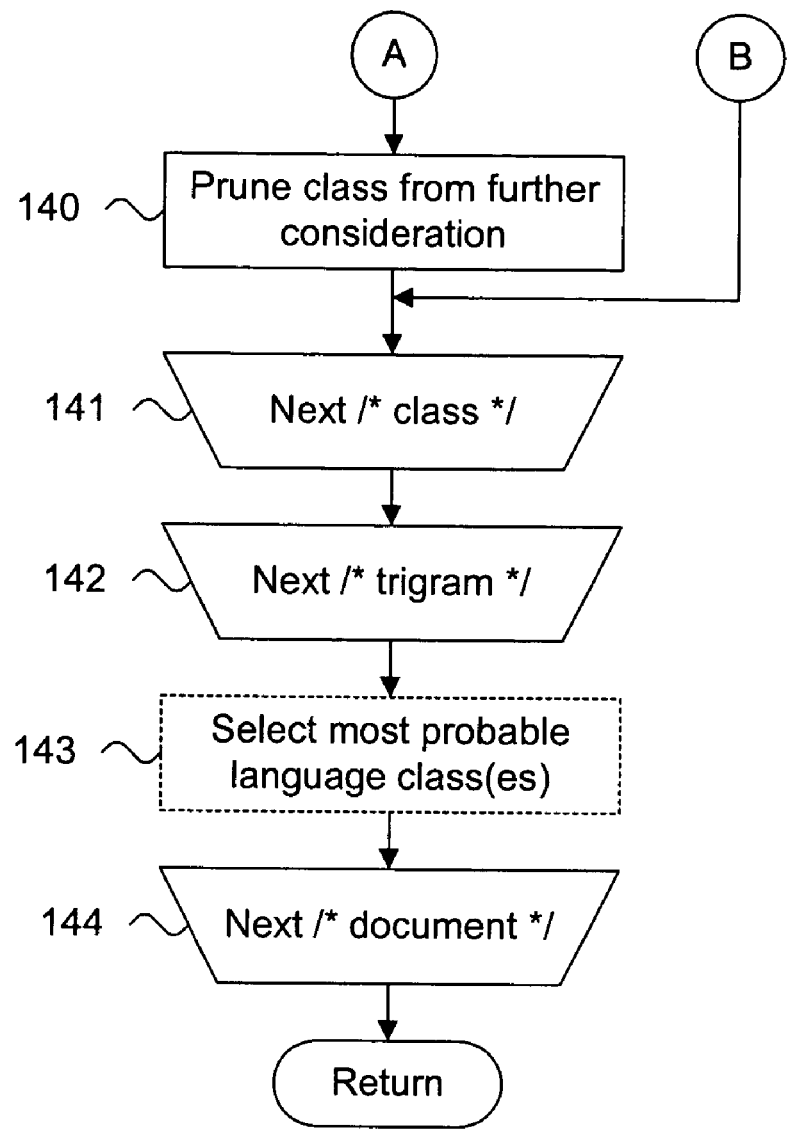

FIG. 9 is a flow diagram showing the routine 130 for classifying documents for use in the routine 70 of FIG. 5. The purpose of this routine is to classify unlabeled documents 57 based on language attributes, which correspond to the top level domain and character set encoding, as specified in the attribute model 55, and based on the text properties of each document 57, as specified in the text model 56.

The unlabeled documents 57 are processed in an iterative processing loop (blocks 131-144), as follows. Each unlabeled document 57 is selected (block 131) and the properties of the selected document 57 are determined (block 132). Each potentially assignable language class 38 is selected (block 133) and the probability assigned to the class is initialized from the attribute model 55 (block 134). Each remaining potentially assignable language class 38 is iteratively processed (block 135).

Each trigram and class are processed in a pair of nested iterative processing loops (blocks 136-142 and 137-141, respectively), as follows. Each trigram is selected (block 136) and each class is selected (block 137). The probability assigned to the class for the current trigram is updated from the text model 56 (block 138). If the class has a low probability, that is, falls below a predefined threshold (block 139), the class is "pruned" from further consideration (block 140). In the described embodiment, the predefined threshold is set to a value determined empirically based on the patterns of occurrences observed during training, which typically reflects a significant drop-off of occurrences for top level domain and character set encoding pairings. Pruning increases processing efficiency but results in a slight loss in accuracy. Each remaining class and trigram are iteratively processed (blocks 141 and 142, respectively). Optionally, the most probable language class or classes are selected (block 143). Each remaining unlabeled document 57 is iteratively processed (block 144), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for identifying language attributes through probabilistic analysis, comprising:

a storage system adapted to store a set of language classes, which each identify a language and a character set encoding, and further adapted to store a plurality of training documents;

an attribute modeler adapted to train an attribute model by evaluating occurrences of one or more document properties within the training documents and, for each language class, calculating a probability for a set of the one or more document properties, the probability conditioned on the occurrence of the language class, the trained attribute model stored in the storage; wherein the document properties comprise at least one of top level domain, HTTP content character set encoding and language header parameters, and HTML content character set encoding and language metatags;

a text modeler adapted to train a text model by evaluating byte occurrences within the training documents and, for each language class, calculating a probability for a set of byte occurrences, the probability conditioned on the occurrence of the language class, the trained text model stored in the storage; and a training engine adapted to calculate an overall probability for at least one of the set of language classes by evaluating the probability for the document properties set based on the attribute model and the probability for the byte occurrences based on the text model.

2. A system according to claim 1, further comprising:

an assignment module adapted to assign the overall probability for a language class in accordance with the formula:

$$\underset{cls}{\operatorname{argmax}} P(text \mid cls) \cdot P(props \mid cls) \cdot P(cls)$$

where cls is the language class, text is the byte occurrences set, props are the document properties, and P(text|cls) is the probability for the byte occurrences, and P(props|cls) is the probability for the document properties set.

3. A system according to claim 1, wherein the document properties comprise at least one of top level domain, HTTP content character set encoding and language header parameters, and HTML content character set encoding and language metatags.

4. A system according to claim 3, further comprising:
an assignment module adapted to assign the probability for the document properties set based on the attribute model in accordance with the formula:

$$P(tld, enc \mid cls) \cdot P(cls)$$

where tld is the top level domain, enc is the character set encoding and cls is the language class.

5. A system according to claim 1, further comprising:
a counting module adapted to count byte co-occurrences within a training document, and determine the probability for the byte occurrences based on the byte co-occurrences.

6. A system according to claim 5, wherein the byte co-occurrences comprise a set of trigrams, further comprising:
a probability module adapted to calculate a probability of a trigram as the number of occurrences of the trigram divided by the total number of trigram occurrences in the training documents for a language class.

7. A system according to claim 6, further comprising:
an assignment module adapted to assign the probability for the byte occurrences set based on the text model in accordance with the formula:

$$P(text \mid cls)$$

where text is the set of trigrams and cls is the language class.

8. A system according to claim 1, further comprising:
a training engine adapted to perform iterative training by providing the probability for the document properties set and the probability for the byte occurrences set respectively to the evaluation of byte occurrences and assignment of the set of language classes.

9. A system according to claim 1, further comprising:
a back off module adapted to evaluate less frequently occurring document properties by calculating a probability for a less frequently occurring document property conditioned on the occurrence of the language class.

10. A system according to claim 1, wherein at least one training document comprises one of a Web page and a news message.

11. A method for identifying language attributes through probabilistic analysis, comprising: defining a set of language classes, which each identify a language and a character set encoding, and a plurality of training documents; evaluating occurrences of one or more document properties within the training documents and, for each language class, calculating a probability for the document properties set conditioned on the occurrence of the language class by an attribute model wherein the document properties comprise at least one of top level domain, HTTP content character set encoding and language header parameters, and HTML content character set encoding and language metatags;

evaluating byte occurrences within the training documents and, for each language class, calculating a probability for the byte occurrences conditioned on the occurrence of the language class by a text model; and calculating an overall probability for ones of the set of language classes by evaluating the probability for the document properties set by the attribute model and the probability for the byte occurrences by the text model.

12. A method according to claim 11, further comprising:
assigning the overall probability for a language class in accordance with the formula:

$$\underset{cls}{\operatorname{argmax}} P(text \mid cls) \cdot P(props \mid cls) \cdot P(cls)$$

where cls is the language class, text is the byte occurrences set, props are the document properties, and P(text|cls) is the probability for the byte occurrences, and P(props|cis) is the probability for the document properties set.

13. A method according to claim 11, wherein the document properties comprise at least one of top level domain, HTTP content character set encoding and language header parameters, and HTML content character set encoding and language metatags.

14. A method according to claim 13, further comprising:
assigning the probability for the document properties set based on the attribute model in accordance with the formula:

$$P(tld, enc \mid cls) \cdot P(cls)$$

where tld is the top level domain, enc is the character set encoding and cls is the language class.

15. A method according to claim 11, further comprising:
counting byte co-occurrences within a training document; and
determining the probability for the byte occurrences based on the byte co-occurrences.

16. A method according to claim 15, wherein the byte co-occurrences comprise a set of trigrams, further comprising:
calculating a probability of a trigram as the number of occurrences of the trigram divided by the total number of trigram occurrences in the training documents for a language class.

17. A method according to claim 16, further comprising:
assigning the probability for the byte occurrences set based on the text model in accordance with the formula:

$$P(text \mid cls)$$

where text is the set of trigrams and cls is the language class.

18. A method according to claim 11, further comprising:
performing iterative training by providing the probability for the document properties set and the probability for the byte occurrences set respectively to the evaluation of byte occurrences and assignment of the set of language classes.

19. A method according to claim 11, further comprising:
evaluating less frequently occurring document properties by calculating a probability for a less frequently occurring document property conditioned on the occurrence of the language class.

20. A method according to claim 11, wherein at least one training document comprises one of a Web page and a news message.

21. A computer-readable storage medium holding code for performing the method according to claim 11.

22. A system for identifying documents by language using probabilistic analysis of language attributes, comprising a set of language classes, each language class comprising a language name and a character set encoding name; a training corpora comprising a plurality of training documents; an attribute modeler adapted to train an attribute model by evaluating a top level domain and character set encoding associated with the training documents and, for each language class, calculating a probability for each such top level domain and character set encoding conditioned on the occurrence of the each language class wherein the document properties comprise at least one of top level domain, HTTP content character set encoding and language header parameters, and HTML content character set encoding and language metatags; a text modeler adapted to train a text model by evaluating co-occurrences of a plurality of bytes within the training documents and, for each language class, calculating a probability for the byte co-occurrences conditioned on the occurrence of the each language class; and a training engine adapted to calculate an overall probability for ones of the set of language classes by evaluating the probability for the top level domain and character set encoding based on the attribute model and the probability for the byte occurrences based on the text model.

23. A system according to claim 22, further comprising: a plurality of unlabeled documents; and a classifier classifying one or more unlabeled documents by at least one language class, comprising: an attribute evaluator determining document properties within the documents and initializing language class probability to each document from the attribute model; a text evaluator evaluating byte occurrences in the documents and updating the language class probability of the each document from the text model; a pruner pruning at least one language class falling below a predetermined probability threshold; and an assignment module assigning at least one language class based on the language class probability of each document.

24. A method for identifying documents by language using probabilistic analysis of language attributes, comprising:
defining a set of language classes, each language class comprising a language name and a character set encoding name;
assembling a training corpora comprising a plurality of training documents;
training an attribute model by evaluating a top level domain and character set encoding associated with each training document and, for each language class, calculating a probability for each such top level domain and character set encoding conditioned on the occurrence of the each language class;
training a text model by evaluating co-occurrences of a plurality of bytes within each training document and, for each language class, calculating a probability for the byte co-occurrences conditioned on the occurrence of the each language class; and
calculating an overall probability for ones of the set of language classes by evaluating the probability for the top level domain and character set encoding based on the attribute model and the probability for the byte occurrences based on the text model.

25. A method according to claim 24, further comprising:
accessing a plurality of unlabeled documents; and
classifying one or more unlabeled documents by at least one language class, comprising:
determining document properties within the documents and initializing language class probability to each document from the attribute model;
evaluating byte occurrences in each document and updating the language class probability of the document from the text model;
pruning at least one language class failing below a predetermined probability threshold; and
assigning at least one language class based on the language class probability of the document.

26. A computer-readable storage medium holding code for performing the method according to claim 22.

27. An apparatus for identifying documents by language using probabilistic analysis of language attributes, comprising:
means for defining a set of language classes, each language class comprising a language name and a character set encoding name;
means for training an attribute model by assigning at least one top level domain and character set encoding pairing to at least one language class for each of a plurality of training documents and calculating a probability for each such top level domain and character set encoding pairing conditioned on the occurrence of the assigned language class;
means for training a text model by evaluating co-occurrences of a plurality of bytes within each training document and, for each language class, calculating a probability for the byte co-occurrences conditioned on the occurrence of the language class based on the attribute model; and
means for calculating an overall probability for ones of the set of language classes by evaluating the probability for the top level domain and character set encoding based on the attribute model and the probability for the byte occurrences based on the text model.

* * * * *

UNITED STATES PATENT AND TRADEMARK OFFICE
CERTIFICATE OF CORRECTION

PATENT NO. : 7,386,438 B1
APPLICATION NO. : 10/634616
DATED : June 10, 2008
INVENTOR(S) : Alexander Franz et al.

It is certified that error appears in the above-identified patent and that said Letters Patent is hereby corrected as shown below:

Title page, item [57]

In the Abstract, line 3, delete "defined," and insert --defined.--

Claim 2, column 13, line 8, delete "P(text/cis)" and insert --P(*text/cls*)--.

Claim 12, column 14, line 24, delete "P(text/cis)" and insert --P(*text/cls*)--.

Signed and Sealed this

Twelfth Day of August, 2008

JON W. DUDAS
*Director of the United States Patent and Trademark Office*